May 15, 1934.  W. BARBER  1,958,605
DRIVE FOR HOUSEHOLD UTENSILS
Filed May 18, 1929  2 Sheets-Sheet 1
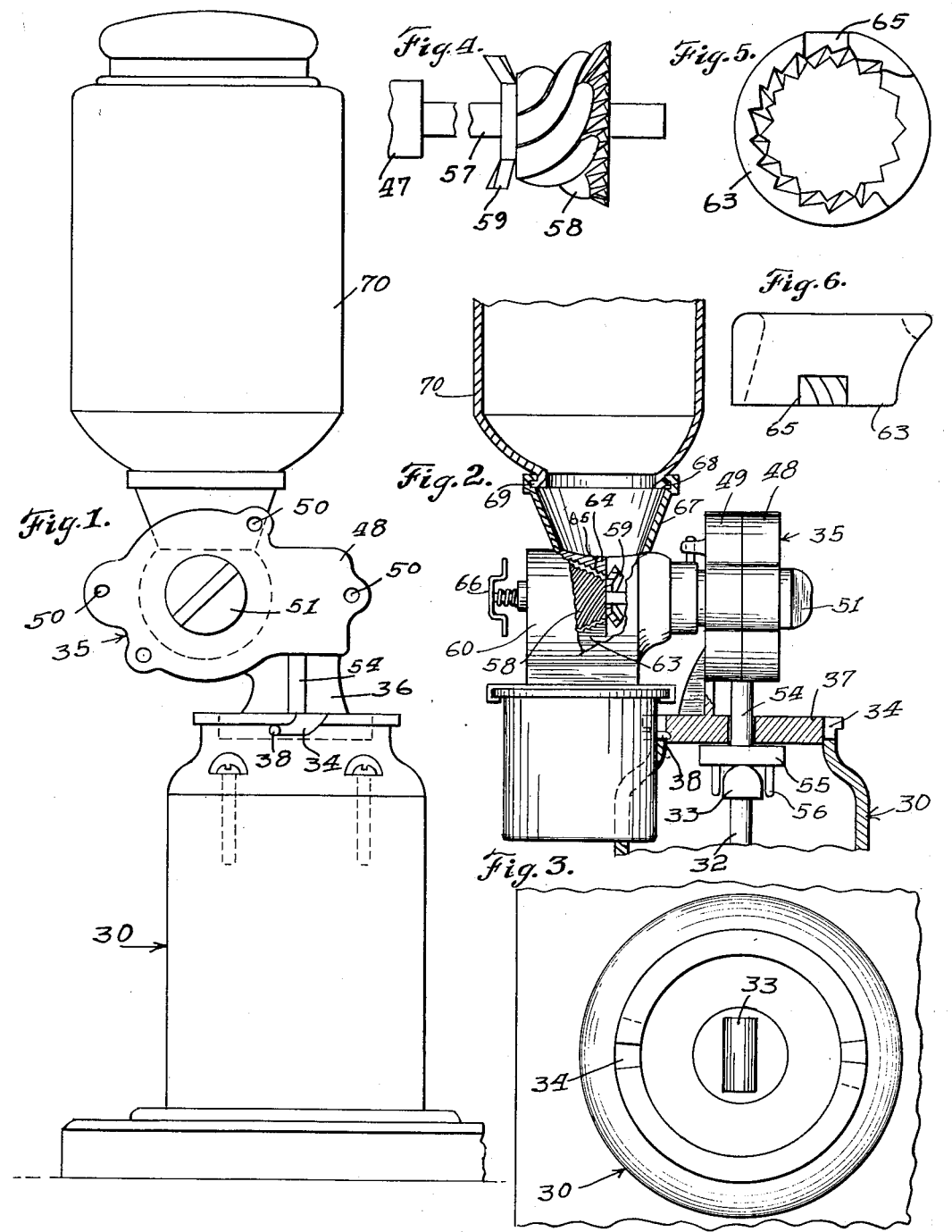
Inventor
William Barber

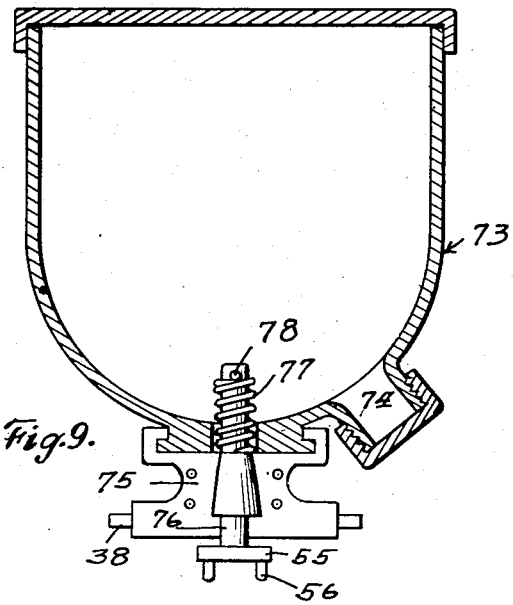
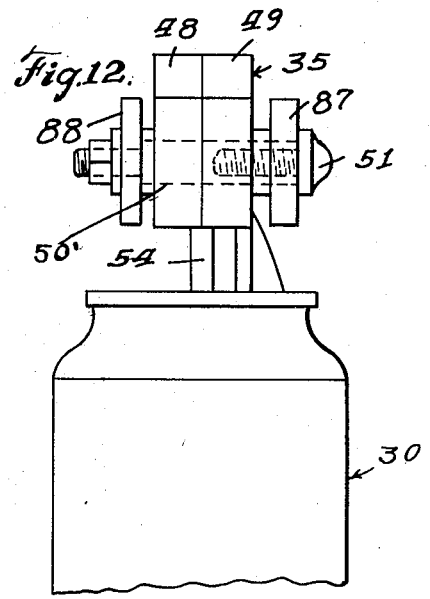
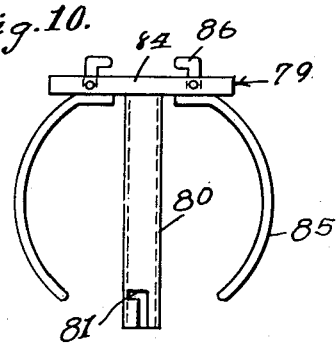
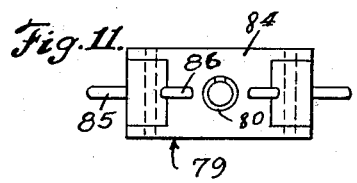
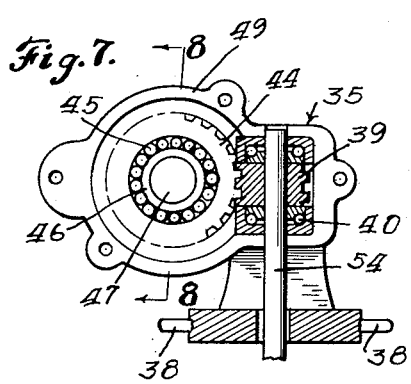
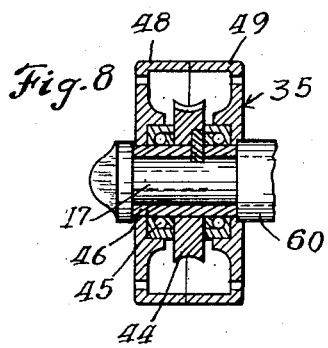

Patented May 15, 1934

1,958,605

UNITED STATES PATENT OFFICE 1,958,605

DRIVE FOR HOUSEHOLD UTENSILS

William Barber, Brooklyn, N. Y.

Application May 18, 1929, Serial No. 364,100

3 Claims. (Cl. 74—7)

This invention relates to an electric driven article for household use, one producing a maximum of work on a minimum of energy and is small and compact and so constructed that it will be foolproof, and built in such a manner as to reduce the ordinary cost of production and operation.

This invention is for the purpose of operating any household utensils, such as coffee grinder, meat chopper, cream whipper, butter churner, potato peeler, sewing machine, fruit juice extractor, etc. To accomplish these things it is necessary to make a compound drive which is capable of driving with very little current and attaining maximum power. Therefore I show certain drawings wherein a worm and gear is applied to the driving sleeve in such a manner that any number of attachments can be applied thereto without any alteration whatever. All that is necessary is to apply the shaft to the driving sleeve, apply the thumb screw and the assembly is performed. A number of these attachments can be applied to the same driving sleeve.

Grinding coffee requires considerable power—to reduce this I make a structure where the male member has an agitator on the end to prevent the coffee clogging in the mill. Next to the agitator is a large screw with sharp edges which breaks the coffee up and smaller teeth to do the grinding after the coffee has been broken up. The female member is so made that it has a stop which fits in the case and has large knives to help break up the coffee and fine knives to the end where the coffee passes through. In this manner I reduce to a minimum the amount of energy necessary to operate the device in like instances.

The object of the present invention is to provide an electric motor so devised that a large number of household utilities may be operated thereby without the employment of complicated connecting mechanisms.

Another object of this invention is to provide a shaft coupling whereby any number of electrically driven utensils may be readily connected to the motor, with reduced or full speed.

Other objects of this invention will be apparent from the following detailed description of the accompanying drawings, illustrating a preferred embodiment, in which;

Figure 1 is a front elevational view of my device with a coffee mill attached.

Figure 2 is a fragmentary side elevation of Figure 1, with parts in section.

Figure 3 is a top plan of motor.

Figure 4 is a side elevational view of one of the details.

Figure 5 is a front elevational view of one of the details.

Figure 6 is a side elevational view of Figure 5.

Figure 7 is an interior view of worm-and-gear housing with parts in section.

Figure 8 is a sectional view taken on line 8—8, of Figure 7.

Figure 9 is a sectional view of one of the attachments.

Figure 10 is a detail view of one of the parts which work in conjunction with that shown in Figure 9.

Figure 11 is a top plan view of Figure 10.

Figure 12 is a fragmentary view of motor with grinder and buffer attachment.

Referring to the drawings in detail, 30 is the motor having the driving shaft 32, said shaft having the coupling member 33. The motor housing is provided with locking slots 34. The worm-and-gear housing 35 is supported by standard 36 and the base portion 37. The base 37 is provided on opposite sides with locking pins 38. Within the housing 35 is the worm 39 having the ball bearings 40, and the gear wheel 44 having the ball bearing 45, and sleeve 46 on the driven shaft 47. The worm-and-gear housing is made up of two sections 48 and 49, and is secured together by the screw bolts 50. The shaft 50' is secured by thumb screw 51. The worm 39 is keyed to shaft 54. Shaft 54 is provided at its lower end with a coupling consisting of a body portion 55 and engaging fingers 56.

The shaft 47 has a reduced end 57 to which is fixed the burr 58 and the agitator 59 of the coffee mill 60. The female member 63 of coffee grinder 60 is secured in position through the engaging lug 64 with the slot 65. The top portion of hopper 67 is provided with an annular groove 68 which engages flange 69 of the bowl 70. One of the attachments 73 is shown in Figure 9, having an outlet port 74 and the split base portion 75, said portion 75 constituting a journal bearing for the direct-coupling, shaft 76 having the coupling members 55 and 56. The upper end of shaft 76 is provided with a tension spring 77 and a pin 78. The agitator 79 shown in Figure 10, having the body portion 80 with shaft 81, the head portion 84, and arms 85, and the stops 86 are a part of the attachment 73.

In Figure 12 is shown my device fitted with a grinder 87 and a buffer 88.

To operate utensils requiring reduced speed the base portion of housing 35, having the pins 38, is placed in the top of motor 30 and given a slight turn until said pins lock within the slots 34. The coupling will adjust itself into driving position due to the structure of the male and female portion thereof.

In the case of articles requiring high speed such as—egg beaters, fruit mixers, and the like the female member of the coupling is secured directly to its shaft and when the locking pins 35 are slipped into the slots 34 the fingers 56 adjust themselves on either side of the male member of the coupling as above stated.

The agitator shown in Figure 10 and 11 is used in conjunction with the device shown in Figure 9. The lower end of body portion 80 is forced over the upper end of shaft 76, against the action of the spring 77, the pin 78 engaging the slot 81, of said shaft, thereby securing it in position. When the agitator 80 rotates at a high speed the arms 85 fly outwards until the stops 86 contact with the head portion 84 thereby checking the spread of said arms. As the substance within the container becomes thicker, due to the agitation the arms drop thereby regulating the speed of the motor.

Having thus described my invention what I claim as new and wish to protect by Letters Patent, is:

1. In an article of the class described, a motor, an open ended housing therefor having elongated lock pin slots formed therein adjacent the open end thereof, a cover plate provided with lock pins thereon for closing off the open end of said housing, a casing mounted on said cover plate, a gearing organization, including a worm, disposed in said casing, and means secured to said worm and extending without said casing and through said cover plate into said housing for effecting engagement between said motor and said gearing organization.

2. In an article of the class described, a motor, a housing therefor having a recessed seat, a plate adapted to set in said recessed seat, a casing mounted on said plate, a gearing organization disposed within said casing, a shaft extending from said casing through said plate into said housing, means to interlock in quickly detachable fashion said plate on the recessed seat, and a plurality of coupling members for engaging the said shaft and motor.

3. In a drive for household devices, a motor, an open ended casing therefor, a drive shaft within said casing adapted to be driven by said motor, a coupling member secured to the free end of said drive shaft, a closure plate adapted to firm and quick attachment to the open end of said casing, means for locking said plate to the top of said casing, a second casing carried by said plate, a gearing organization including a worm disposed in said second casing, a shaft secured to said worm and extending from said casing through said plate into the motor casing, a coupling member secured to the free end of said worm shaft and adapted to engagement with the coupling member of the motor drive shaft, and means for effecting engagement, in quickly detachable fashion, between a selected driveable household device and the gearing organization disposed in said second casing.

WILLIAM BARBER.